Dec. 6, 1966  B. HURKO  3,290,483
COMBINED BROILER AND CATALYTIC OXIDATION UNIT
Filed Sept. 15, 1964  2 Sheets-Sheet 1

INVENTOR
BOHDAN HURKO
BY Richard L. Caslin
HIS ATTORNEY

Dec. 6, 1966   B. HURKO   3,290,483
COMBINED BROILER AND CATALYTIC OXIDATION UNIT
Filed Sept. 15, 1964   2 Sheets-Sheet 2

INVENTOR.
BOHDAN HURKO
BY Richard L. Caslin
HIS ATTORNEY

United States Patent Office 3,290,483
Patented Dec. 6, 1966

3,290,483
COMBINED BROILER AND CATALYTIC
OXIDATION UNIT
Bohdan Hurko, Louisville, Ky., assignor to General
Electric Company, a corporation of New York
Filed Sept. 15, 1964, Ser. No. 396,550
4 Claims. (Cl. 219—393)

The present invention relates to a broiler for use in either an electric or gas baking oven for domestic use where the broiler is also provided with an integral catalytic oxidation unit that is capable of consuming or incinerating all of the smoke and other undesirable components in the gases generated by the radiant heating energy of the broiler.

This invention was developed as an improvement over the combined broiler and smoke eliminator designs that are disclosed and claimed in the patents of J. H. Fries, Jr., 2,729,735 and K. H. Walkoe 2,922,018 which are both assigned to the General Electric Company the assignee of the present invention. Normal cooking temperatures range from about 150° F. to about 550° F. At temperatures of about 380° F. smoke, odors and other undesirable components are generated such as a mixture of vaporized greases and water vapor which tend to build up as encrusted soil on the walls of the oven liner as well as being discharged from the oven vent and diffused throughout the kitchen. Combined broilers and catalytic oxidation units are old in the art, but the invention herein is distinguishable from such prior art in that the catalytic oxidation unit is capable of functioning even when the broiler may be de-energized. Accordingly, the heat of combustion of the oxidation unit may either be derived from the broiler unit, or it may be due solely to exposure to the hot oven gases or it may be heated from both sources. It has been discovered that the smoke, odors and other undesirable components in the oven exhaust will undergo an exothermic reaction at relatively low temperatures starting in a range between 300° F. and 400° F. thereby rendering the temperature of the oxidation unit self-sustaining until all of the impurities in the exhaust are consumed. The particular starting temperature depends upon the kind of smoke being consumed, the type of catalyst and both the kind and area of contact of the ceramic material.

The principal object of the present invention is to provide a combined broiler and catalytic oxidation unit, where the oxidation unit is operational at low temperatures in the vicinity of 300° F. and above without requiring the use of supplemental heaters.

A further object of the present invention is to provide a combined broiler and catalytic oxidation unit using as its main element a perforated ceramic block of cellular construction that functions both as a radiant energy source for an oven cavity and a portion thereof doubling as a catalytic coated oxidation means associated with an oven vent to consume the organic gaseous matter that comes in contact therewith before being returned to the atmosphere.

A further object of the present invention is to provide a broiler unit for either a gas or electric domestic oven which is capable of consuming the smoke, odors and other undesirable components of the gases which it produces during broiling, roasting or other high temperature operations.

A still further object of the present invention is to provide a combined broiler and catalytic oxidation unit of pleasing appearance, where the oxidation unit is capable of radiating enough heat to serve as a working portion of the broiler for cooking purposes.

The present invention, in accordance with one form thereof, is embodied in a broiler unit for use in a domestic oven, either gas or electric, and comprising an inverted housing of solid ceramic material supporting a perforated ceramic block of cellular construction. A vent pipe extends through the housing and has a lower portion in close proximity to the top surface of the ceramic block to circumscribe a limited number of the perforations thereof. A catalytic material is used to coat the perforations circumscribed by the vent pipe to establish a catalytic oxidation unit for the vent pipe. A source of radiant heat energy (either gas or electric) is present within the housing for raising the temperature of the ceramic block until it radiates infra-red energy for broiling purposes as well as top heating means for roasting and baking, while it also functions as a smokeless and odorless broiler unit.

My invention will be better understood from the following description taken in conjunction with the accompanying drawings and its scope will be pointed out in the appended claims.

Figure 1:
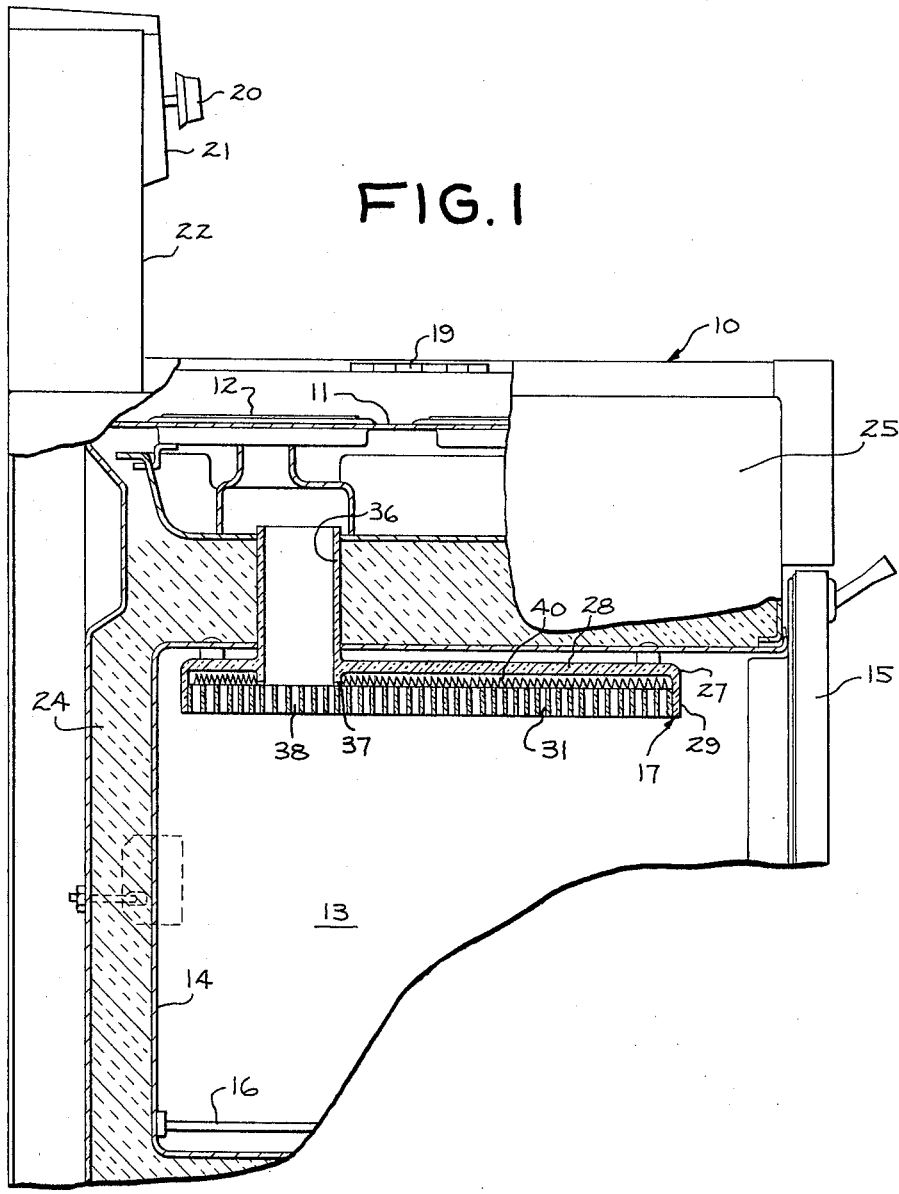
FIGURE 1 is a left side elevation view of a domestic electric range embodying the present invention with some parts broken away and others in cross-section to show the nature of the combined broiler and catalytic oxidation unit embodying the present invention positioned in the top portion of the oven cavity.

Turning to a consideration of the drawings and in particular to FIGURE 1, there is shown for illustrative purposes an electric range 10 having a top cooking surface or cooktop 11 with a plurality of surface heating elements 12, and an oven cavity 13 formed by a box-like oven liner 14 and a front-opening drop door 15. The oven cavity is supplied with a standard baking element 16 in the lower portion of the oven cavity and a second heating element or broiler unit 17 which forms the subject matter of the present invention. The surface heating elements 12 are controlled by selector switches 19 located in the side arms of the cooktop 11. Moreover, the oven heating units 16 and 17 are controlled by an oven selector switch and thermostat identified only generally as element 20, and located in a control panel 21 in a backsplasher 22 that is vertically arranged along the back edge of the cooktop 11 as is conventional in this art. Suitable thermal insulation 24 such as fiberglass is used to surround the oven liner 14 for retaining the heat generated within the oven cavity. A range body or cabinet structure 25 forms the external structure of the range for supporting the various components therein, and it is provided with an appearance finish of porcelain enamel or stainless steel or the like as is well understood in this art.

Figure 2:
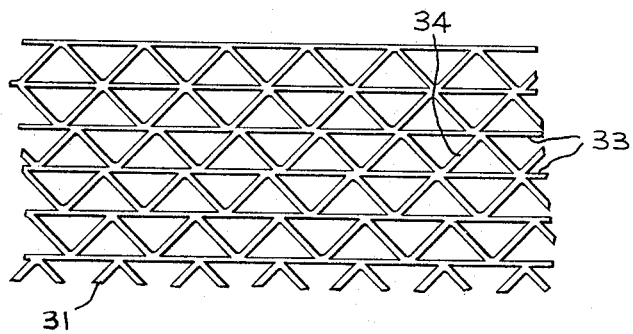
FIGURE 2 is a fragmentary plan view on an enlarged scale of a perforated ceramic block of cellular construction which is used as the principal element of the combined broiler and oxidation unit embodying the present invention.

The broiler unit 17 comprises an inverted pan-shaped housing 27 of ceramic material having a top wall 28 of generally rectangular shape in plan view and a downturned peripheral flange 29. Assembled within the housing is a perforated ceramic block 31 of cellular construction which serves as a radiant heating means. Such a ceramic block 31 is shown in detail in the enlarged plan view of FIGURE 2. One particular type of ceramic material that has been found acceptable for this application is a corrugated ceramic material sold by the Minnesota Mining and Manufacturing Company through the American Lava Corporation. There are two types of ceramic materials that have been found most successful; namely, cordierite and alumina. The designation corrugated ceramic refers to the cellular construction of the material having a configuration of multiple layers of corrugated paper with a series of parallel spaced partitions 33 where each pair of partitions is separated by a corrugated spacer 34. The corrugations measure about seven corrugations per inch and the width of each cell is about .100 inch, while the depth of the block is about one-half inch. Thus it can be seen that the ceramic block is indeed perforated and of cellular construction that might be described by some as depicting a honeycomb, except that the cells are not hexagonal in configuration as is the case in a true honeycomb. In any event there is a relatively large area of ceramic contact surface as compared with the volume of the ceramic block material.

An oven vent pipe 36 is formed as part of the top wall 28 of the broiler housing 27, and the lower edge 37 of the vent pipe is in direct contact with the top surface of the ceramic block. Hence, the vent pipe 36 circumscribes a limited number of perforations or cells of the ceramic block. The perforations so circumscribed are covered with a catalytic material such as platinum black or the like and particularly the interior surfaces of the cells. Thus, the catalyst coated portion of the ceramic block represents a catalytic oxidation unit 38 cooperating with the vent pipe 36 in that all oven exhaust gases are caused to pass upwardly through this coated section by a natural draft created by the chimney effect of the vent pipe 36.

A source of radiant heating energy is present within the broiler housing 27, and this energy may be created either by natural gas combustion or by the use of electric resistance heating elements. The second modification is illustrated in FIGURE 1 of the drawing in the form of an open coiled heating unit 40 of tortuous configuration which is placed on the top of the ceramic block 31 and held in place by a suitable means. Since the heating unit 40 is totally enclosed by the housing 27 and ceramic block 31 resort may be had to the open coiled unit rather than using a metal sheathed unit. This also provides a faster heat exchange and a shorter preheat time.

A reflective surface with low emissivity may be applied to both inner and outer surfaces of the reflector 27 to direct radiant energy downwardly upon food placed directly therebeneath. If natural gas were used it would be necessary to provide a high temperature gasket under the bottom edge of the vent pipe 36 as at 37 so there is no cross-flow between the broiler portion and the oxidation unit. Broiling operations are usually performed with a strong flow of room air through the oven cavity by setting the oven door to a partially open position where the air is exhausted through the oven vent. Hence, the broiling of food is done not by exposing the food to a high temperature oven but rather by locating the food closely beneath the broiler where it is exposed to radiant heating energy given off by the source of heat. Usually the oven thermostat is set at its maximum setting or broil position representing a temperature in the vicinity of 550° F., and there is a great deal of grease spatter, water vapor, smoke, odors and other undesirable gaseous components generated during such an operation. The smoking takes place at temperatures of around 380° F.

These undesirable products of combustion are caused to pass through the catalytic coated area 38 of the ceramic block 31 by the chimney effect of the oxidation unit. In the particular embodiment of the invention illustrated, once the ceramic block has attained a temperature of about 390° F., an exothermic reaction takes place which increases the rate of temperature rise of the oxidation unit and incinerates all of the undesirable components before the exhaust gases reach the kitchen atmosphere. Thus this broiler may be recognized as a smokeless and odorless broiler unit which has a catalytic oxidation unit built therein and which may utilize not only an electric resistance source of heat energy; but gas as well, where the combustion gases would flow down through the perforations of the ceramic block and would eventually turn and be drawn upwardly through the vent pipe 36 for return to the kitchen atmosphere.

Figure 3:
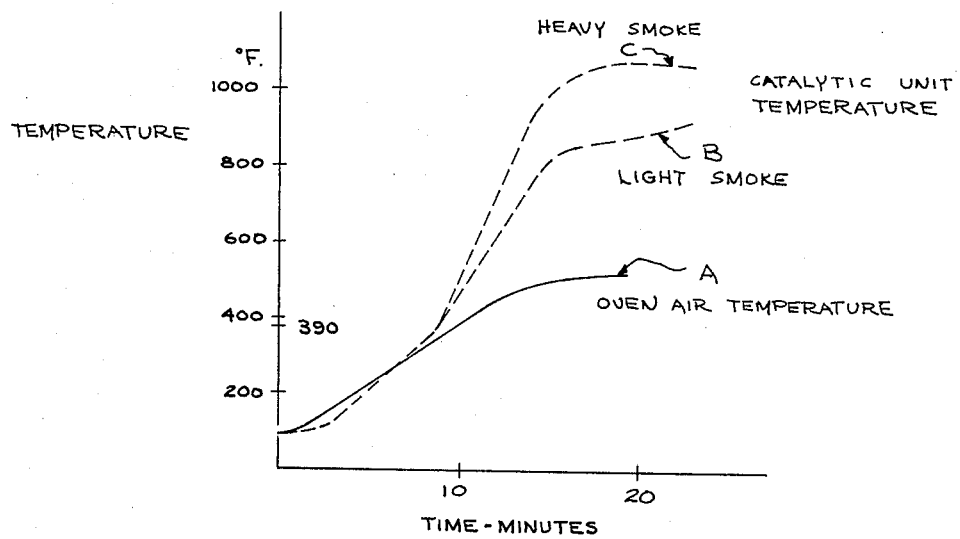
FIGURE 3 is a time-temperature graph illustrating the relationship between the oven air temperature, and the oxidation unit temperature for a normal and a light and a heavy smoking condition during broiling.

A better understanding of the operation of one specific example of catalytic oxidation unit, arranged in accordance with this invention, can be had by studying the time-temperature graph of FIGURE 3, where the time is plotted along the abscissa and the temperature is plotted along the ordinate. This graph includes three curves; namely, curves A, B, and C. Curve A is the curve of oven air temperature. Curve B is a temperature curve of the oxidation unit under light smoking conditions in the oven, for example as produced by three teaspoons of food shortening. The third curve C is similar to curve B except that a heavier amount of smoke is being handled; for example, that produced by five teaspoons of grease. The interesting point to note in these curves is the fact that the temperature of the oxidation unit and particularly of its ceramic block lags behind the oven air temperature at the beginning of the cycle then it leads due to the heat exchange from the hot broiler area until the block temperature reaches about 390° F., at which point the rate of temperature rise of the ceramic block increases sharply over the rate of temperature rise of the oven air signifying the existence of an exothermic reaction as the smoke, odors, and other undesirable properties are oxidized. The ceramic block temperature exceeds the oven air temperature and remains above the oven air temperature until all of the undesirable properties of the exhaust air have been eliminated. The ceramic block may be heated merely by the hot oven exhaust gases rather than by the resistance heating element 40. Thus, it will be appreciated that the oxidation unit is self-sustaining at a rather low temperature of about 390° F. Such an operation would be advantageous if the oven were one using a pyrolytic process for cleaning the oven soil from the walls of the oven liner by raising the oven temperature to within a range between about 750° F. and 950° F. in the manner disclosed and claimed in the patent of Bohdan Hurko 3,121,158. Hence, it is not necessary for the heating element 40 to be energized in order for the oxidation unit 38 to be operational, as long as the oxidation unit is heated to a temperature at or above about 390° F.

Having described above a specific embodiment of the present invention, it will be understood by those skilled in this art that while the starting temperature for the exothermic reaction has been located in a temperature range between 300° F. and 400° F., the particular starting temperature will depend on the following factors: the kind of smoke and undesirable gases being handled by the oxidation unit, the type of catalyst being used, as well as both the kind and area of contact of the supporting substrate or ceramic material.

Modifications of this invention will occur to those skilled in this art, therefore, it is to be understood that this invention is not limited to the particular embodiments disclosed but that it is intended to cover all modifications which are within the true spirit and scope of the invention as claimed.

What I claim as new and desire to secure by Letters Patent of the United States is:

1. A combined broiler and catalytic oxidation unit comprising an inverted pan-shaped housing having a vent pipe therein, a perforated ceramic block of cellular construction positioned within the housing, a source of radiant heat energy combined with the housing for heating the ceramic block, the vent pipe being in contact with the ceramic block and encompassing a limited area of the perforations, a catalytic coating covering the surface of the perforations in the said limited area whereby the catalytic coated portion of the ceramic block constitutes a catalytic oxidation unit when operating at relatively low temperatures of about 300° F. and above so that smoke and other objectionable products of combustion generated by the broiler will be oxidized before being exhausted through the vent pipe by a natural draft created thereby.

2. A combined broiler and catalytic oxidation unit for use in a domestic oven comprising an inverted housing supporting a perforated ceramic block of cellular construction, the housing having an upper wall with a vent pipe positioned therein, the vent pipe circumscribing a portion of the perforations in the ceramic block, said circumscribed perforations being coated with a catalytic material and establishing a catalytic oxidation unit within the vent pipe, and a source of radiant heat energy present within the housing, a reflective coating material applied to the said housing to direct the heat energy downwardly through the ceramic block.

3. A combined broiler and catalytic oxidation unit for use in a domestic oven comprising an inverted pan-shaped housing of ceramic material supporting a perforated ceramic block of cellular construction across the bottom portion thereof, the housing having a top wall with a vent pipe extending therethrough into close contact with the top surface of the ceramic block, the portion of the ceramic block that is circumscribed by the lower end of the vent pipe being provided with a catalytic coating and establishing a catalytic oxidation unit cooperating with the vent pipe, a source of radiant heat energy present within the housing and surrounding the vent pipe, whereby a natural upward draft is created in the vent pipe so that smoke, odors and other undesirable gaseous products generated by the radiant heat energy of the broiler will be drawn through the oxidation unit which becomes heated and at relatively low temperatures of between about 300° F. and 400° F. and above will remove the undesirable products of the effluent before they are discharged from the vent pipe to the atmosphere.

4. A combined broiler and catalytic oxidation unit for use in a domestic oven comprising a top wall, an electric resistance heating unit supported thereunder, and a perforated ceramic block of cellular construction supported beneath the heating unit, a vent pipe extending through the top wall and being in close proximity to the ceramic block to circumscribe a limited number of the perforations, a catalytic material coating the surfaces of said limited number of perforations to establish a catalytic oxidation unit in the vent pipe, where the coated portion of the ceramic derives heat from the remainder of the block and will radiate enough heat to serve as a working portion of the broiler for cooking purposes.

References Cited by the Examiner
UNITED STATES PATENTS 2,729,735    1/1956    Fries _____ 219—398
2,922,018    1/1960    Walkoe _____ 219—393

RICHARD M. WOOD, *Primary Examiner.*
C. L. ALBRITTON, *Assistant Examiner.*